United States Patent
Kim et al.

(10) Patent No.: US 9,479,300 B2
(45) Date of Patent: Oct. 25, 2016

(54) FEEDBACK METHOD IN COORDINATED MULTI-POINT COMMUNICATION SYSTEM AND APPARATUS THEREOF

(71) Applicant: LG Electronics Inc., Seoul (KR)

(72) Inventors: Hyungtae Kim, Gyeonggi-do (KR); Hanbyul Seo, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 127 days.

(21) Appl. No.: 14/349,384

(22) PCT Filed: Oct. 11, 2012

(86) PCT No.: PCT/KR2012/008257
§ 371 (c)(1),
(2) Date: Apr. 3, 2014

(87) PCT Pub. No.: WO2013/055120
PCT Pub. Date: Apr. 18, 2013

(65) Prior Publication Data
US 2014/0241201 A1    Aug. 28, 2014

Related U.S. Application Data

(60) Provisional application No. 61/546,047, filed on Oct. 11, 2011.

(51) Int. Cl.
*H04W 4/00* (2009.01)
*H04L 5/00* (2006.01)
(Continued)

(52) U.S. Cl.
CPC ............ *H04L 5/0035* (2013.01); *H04B 7/024* (2013.01); *H04B 7/0417* (2013.01);
(Continued)

(58) Field of Classification Search
CPC .... H04B 15/00; H04W 72/04; H04W 72/08; H04W 72/1278; H04W 24/10
See application file for complete search history.

(56) References Cited

U.S. PATENT DOCUMENTS 8,599,711 B2 * 12/2013 Hugl ..................... H04W 24/10
  370/252
2010/0304682 A1   12/2010 Choi et al.
(Continued)

FOREIGN PATENT DOCUMENTS

JP        2011-071993 A     4/2011
KR    10-2010-0128936 A    12/2010
(Continued)

OTHER PUBLICATIONS

Written Opinion and International Search Report issued in corresponding International Patent Application No. PCT/KR2012/008257 dated Feb. 15, 2013.
(Continued)

*Primary Examiner* — Alvin Zhu
*Assistant Examiner* — Bo Hui A Zhu
(74) *Attorney, Agent, or Firm* — Morgan, Lewis & Bockius LLP

(57) ABSTRACT

The present invention relates to a wireless communication system, and more specifically to a method and an apparatus for feeding back the muting point information in a coordinated multi-point communication system. A method for enabling a terminal to transmit feedback information for the coordinated transmission in the wireless communication system according to one embodiment of the present invention comprises the steps: receiving reference signals for the feedback of the channel state information from a plurality of base stations capable of participating in the coordinated transmission; measuring each channel state value for the plurality of base stations based on the reference signals; and transmitting the muting point information to indicate the preferring base station participating in the coordinated transmission among the plurality of base stations.

8 Claims, 16 Drawing Sheets

(51) Int. Cl.
- *H04J 11/00* (2006.01)
- *H04B 7/02* (2006.01)
- *H04B 7/04* (2006.01)
- *H04W 24/10* (2009.01)
- *H04B 7/06* (2006.01)

(52) U.S. Cl.
CPC .......... *H04J 11/0053* (2013.01); *H04L 5/005* (2013.01); *H04L 5/0057* (2013.01); *H04L 5/0073* (2013.01); *H04W 24/10* (2013.01); *H04B 7/063* (2013.01); *H04B 7/0632* (2013.01); *H04B 7/0636* (2013.01); *H04B 7/0639* (2013.01)

(56) References Cited

U.S. PATENT DOCUMENTS

| | | | |
|---|---|---|---|
| 2010/0322351 A1* | 12/2010 | Tang | H04B 7/024 375/316 |
| 2011/0170435 A1* | 7/2011 | Kim | H04L 5/0023 370/252 |
| 2011/0243009 A1 | 10/2011 | Chandrasekhar et al. | |
| 2012/0113816 A1* | 5/2012 | Bhattad | H04L 5/0032 370/246 |

FOREIGN PATENT DOCUMENTS

| | | |
|---|---|---|
| KR | 10-2011-0083445 A | 7/2011 |
| WO | 2011/020062 A2 | 2/2011 |

OTHER PUBLICATIONS

3GPP TR 36.819 V2.0.0, "3GPP; TSGRAN; Coordinated multi-point operation for LTE physical layer aspects (Release 11)", pp. 1-70, Sep. 2011.

International Search Report dated Feb. 15, 2013 for International application No. PCT/KR2012/008257.

* cited by examiner (a)

(b)

(a)

(b)

US 9,479,300 B2

FEEDBACK METHOD IN COORDINATED MULTI-POINT COMMUNICATION SYSTEM AND APPARATUS THEREOF

TECHNICAL FIELD

The following description relates to a wireless communication system and, more particularly, to a method and apparatus for transmitting and receiving channel state information in a cooperative multipoint communication system.

BACKGROUND ART

MIMO (multiple-input multiple-output) refers to a method for improving data transmission/reception efficiency by adopting multiple transmit (Tx) antennas and multiple receive (Rx) antennas rather than using a single Tx antenna and a single Rx antenna. A receiving side receives data through a single antenna path when a single antenna is used, whereas the receiving side receives data through multiple paths when multiple antennas are used. Accordingly, MIMO may increase data transfer rate and throughput and improve coverage.

Single-cell MIMO may be classified into single user MIMO (SU-MIMO) in which a single user equipment (UE) receives a downlink signal in a single cell and multi-user MIMO (MU-MIMO) in which two or more UEs receive downlink signals in a single cell.

Meanwhile, a coordinated multipoint (CoMP) system for improving throughput of a UE located at a cell edge by applying improved MIMO to a multi-cell environment is being studied. The CoMP system may reduce inter-cell interference in a multi-cell environment and improve system performance.

DISCLOSURE

Technical Problem

For CoMP operation, a UE operating in a multi-cell environment needs to feed back channel state information (CSI) on a serving cell and CSI on a neighboring cell participating in CoMP operation. Here, when a conventional CSI feedback method with respect to a single cell is used, the number of cells whose CSI needs to be fed back increases, resulting in feedback overhead increase.

In addition, since feedback overhead increases in a CoMP system while capacity of a channel on which feedback information can be transmitted is limited, sufficient feedback information for CoMP operation may not be transmitted.

An object of the present invention devised to solve the problem lies in a method and apparatus for feeding back muting point information in a system supporting CoMP operation.

The technical problems solved by the present invention are not limited to the above technical problems and those skilled in the art may understand other technical problems from the following description.

Technical Solution

The object of the present invention can be achieved by providing a method for enabling a user equipment (UE) to transmit feedback information with respect to coordinated multi-point (CoMP) transmission in a wireless communication system, the method including: receiving reference signals for feedback of channel state information (CSI) from a plurality of base stations capable of participating in CoMP transmission; measuring channel state values with respect to the plurality of base stations on the basis of the reference signals; and transmitting muting point information determined on the basis of the channel state values and indicating a preferred base station not-participating in CoMP transmission from among the plurality of base stations.

In another embodiment of the present invention, provided herein is a method for enabling a UE to transmit feedback information with respect to CoMP transmission in a wireless communication system, the method including: receiving a first reference signal on the basis of first configuration information corresponding to a case in which interference from a plurality of base stations capable of participating in CoMP transmission is present; receiving a second reference signal on the basis of second configuration information corresponding to a case in which interference from the remaining base stations except for at least one of the plurality of base stations is present; respectively measuring a first channel state value and a second channel state value on the basis of the first reference signal and the second reference signal; calculating a channel quality index (CQI) on the basis of one selected between the first channel state value and the second channel state value; and transmitting the CQI and a selection index including information on the selection.

In another embodiment of the present invention, provided herein is a UE for transmitting feedback information with respect to CoMP transmission in a wireless communication system, the UE including: a reception module for receiving downlink signals from a plurality of base stations capable of participating in CoMP transmission; a transmission module for transmitting an uplink signal to the plurality of base stations; and a processor for controlling the UE comprising the reception module and the transmission module, wherein the processor is configured to receive reference signals for CSI feedback from the plurality of base stations through the reception module, to measure channel state values with respect to the plurality of base stations on the basis of the reference signals, and to transmit muting point information through the transmission module, the muting point information being determined on the basis of the channel state values and indicating a preferred base station not-participating in CoMP transmission from among the plurality of base stations.

In another embodiment of the present invention, provided herein is a UE for transmitting feedback information with respect to CoMP transmission in a wireless communication system, the UE including: a reception module for receiving downlink signals from a plurality of base stations capable of participating in CoMP transmission; a transmission module for transmitting an uplink signal to the plurality of base stations; and a processor for controlling the UE comprising the reception module and the transmission module, wherein the processor is configured to receive, through the reception module, a first reference signal on the basis of first configuration information corresponding to a case in which interference from a plurality of base stations capable of participating in CoMP transmission is present, to receive, through the reception module, a second reference signal on the basis of second configuration information corresponding to a case in which interference from the remaining base stations except for at least one of the plurality of base stations is present, to respectively measure a first channel state value and a second channel state value on the basis of the first reference signal and the second reference signal, to calculate a CQI on the basis of one selected between the first channel state value and the second channel state value and to transmit the CQI and a selection index including information on the selection through the transmission module.

The following may be commonly applied to the above-described embodiments of the present invention.

The method may further include determining a base station not-participating in CoMP transmission from among the plurality of base stations on the basis of the muting point information on a network.

The method may further include receiving muting point combination information about combinations of base stations not-participating in CoMP transmission from among the plurality of base stations, wherein the muting point information indicates one of the combinations included in the muting point combination information.

The muting point information may indicate a specific number of base stations from among the plurality of base stations as preferred non-participating base stations.

The muting point information may indicate a predetermined number of or fewer base stations from among the plurality of base stations as preferred non-participating base stations.

The calculating of the CQI may include: calculating the CQI on the basis of the second channel state value when a difference between the second channel state value and the first channel state value is greater than a muting reference value; and calculating the CQI on the basis of the first channel state value when the difference between the second channel state value and the first channel state value is less than or equal to the muting reference value.

The first reference signal and the second reference signal may be disposed in different subframes.

The first reference signal and the second reference signal may be disposed in different resource elements.

The method may further include receiving the first configuration information and the second configuration information.

The above description and the following description are exemplary and are for additional explanation of the claims.

Advantageous Effects

According to the present invention, it is possible to provide a method and apparatus for feeding back muting point information in a system supporting CoMP operation.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
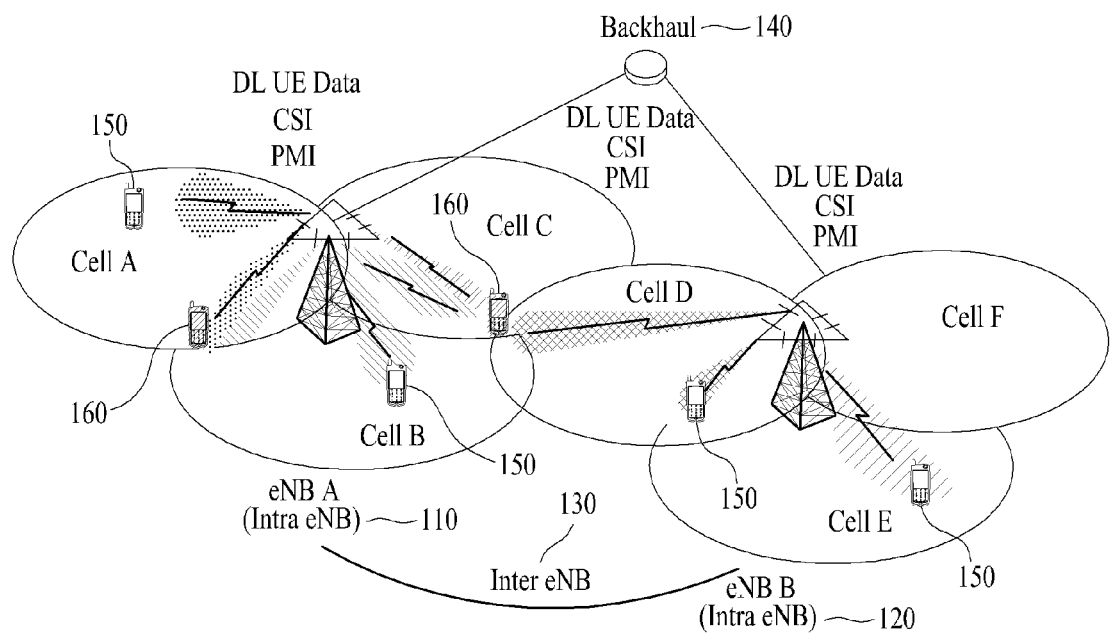
FIG. 1 is a conceptual view illustrating CoMP operations of an intra eNB and an inter eNB.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc. The term 'UE' may be replaced with the term 'terminal', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed for at least one of wireless access systems, Institute of Electrical and Electronics Engineers (IEEE) 802, 3$^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention may be supported by those documents. Further, all terms as set forth herein may be explained by the standard documents.

Techniques described herein may be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN-OFDMA Reference System) and the IEEE 802.16m standard (WirelessMAN-OFDMA Advanced System). For clarity, this application focuses on the 3GPP LTE/LTE-A system. However, the technical features of the present invention are not limited thereto.

A description will be given of a CoMP system with reference to FIG. 1. FIG. 1 is a conceptual view illustrating CoMP operations of an intra eNB and an inter eNB.

In order to meet the requirements of 3GPP LTE-A, coordinated multipoint (CoMP) transmission (usually referred to as co-MIMO, collaborative MIMO, network MIMO, etc.) has been proposed for system performance enhancement. CoMP can increase cell-edge UE performance and enhance average sector throughput.

In general, inter-cell interference (ICI) may reduce cell-edge UE performance and average sector throughput under a multi-cell environment with a frequency reuse factor of 1. To mitigate ICI, a simple passive technique, such as fractional frequency reuse (FFR) with UE specific power control has been employed in LTE in order to provide reasonable throughput performance for cell-edge UEs in an interference-limited environment. Instead of reducing frequency resource usage per cell, it is more beneficial to reuse ICI as a desired signal or mitigate the ICI. To accomplish the above object, CoMP transmission is applicable.

Referring to FIG. 1, intra eNBs 110 and 120 and an inter eNB 130 are present in a multi-cell environment.

In LTE, an intra eNB is composed of several cells (or sectors). Cells belonging to an eNB to which a specific UE belongs correspond to the intra eNBs 110 and 120 with respect to the specific UE. That is, cells that share an eNB including a cell to which a specific UE belongs correspond to intra eNBs 110 and 120 and cells that belonging to other eNBs correspond to inter eNBs 130. The cells (i.e. intra eNBs) based on the eNB to which the specific UE belongs may exchange information (e.g. data, channel state information (CSI), etc.) without an additional interface between schedulers thereof, whereas cells (i.e. inter eNBs) based on other eNBs may exchange information through a backhaul 140, etc.

As shown in FIG. 1, a single-cell MIMO UE 150 located in a single cell may communicate with a single serving eNB in one cell (cell A, cell B, cell D or cell E) and a multi-cell MIMO UE 160 located at a cell edge may communicate with a plurality of serving eNBs in multiple cells (cell A and cell B or cell B, cell C and cell D).

CoMP schemes applicable to downlink may be categorized into joint processing (JP) and coordinated scheduling/beamforming (CS/CB).

In JP, each point (eNB) of a CoMP coordination unit may use data. The CoMP coordination unit refers to a set of eNBs used for a coordinated transmission scheme. JP may be divided into joint transmission and dynamic cell selection.

Joint transmission refers to a scheme through which PDSCHs are simultaneously transmitted from a plurality of points (some or all CoMP coordination units). That is, data may be simultaneously transmitted to a single UE from a plurality of transmission points. Through joint transmission, quality of a received signal may be improved coherently or non-coherently and interference on other UEs may be actively eliminated.

Dynamic cell selection refers to a scheme by which a PDSCH is transmitted from one point (in a CoMP coordination unit). That is, data is transmitted to a single UE from a single point at a specific time, other points in the coordination unit do not transmit data to the UE at the time, and the point that transmits the data to the UE may be dynamically selected.

According to the CS/CB scheme, CoMP coordination units may collaboratively perform beamforming of data transmission to a single UE. Here, user scheduling/beaming may be determined according to coordination of cells in a corresponding CoMP coordination unit although data is transmitted only from a serving cell.

In case of uplink, coordinated multi-point reception refers to reception of a signal transmitted according to coordination among a plurality of points geographically spaced apart from one another. A CoMP reception scheme applicable to uplink may be classified into joint reception (JR) and coordinated scheduling/beamforming (CS/CB).

JR is a scheme by which a plurality of reception points receives a signal transmitted over a PUSCH and CS/CB is a scheme by which user scheduling/beamforming is determined according to coordination among cells in a corresponding CoMP coordination unit while one point receives a PUSCH.

Figure 2:
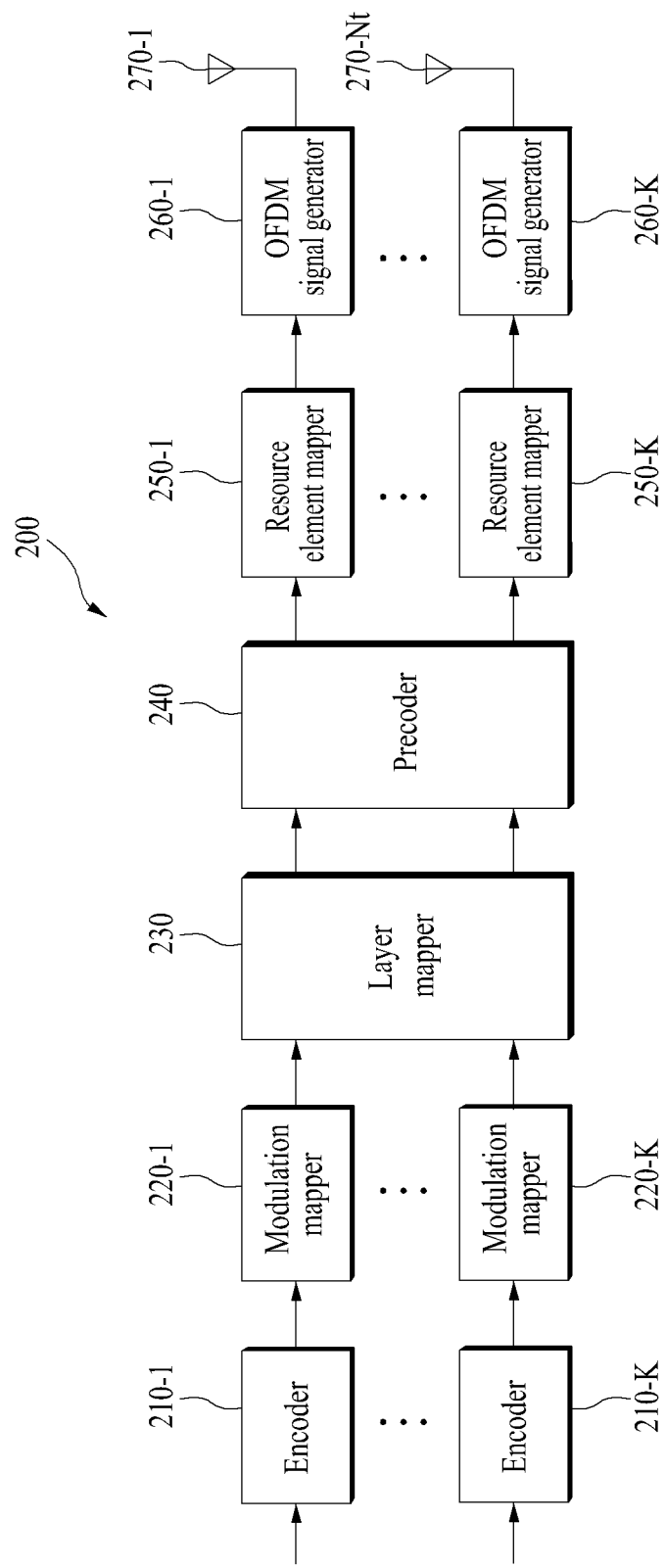
FIG. 2 is a block diagram illustrating the structure of a transmitter including multiple antennas.

FIG. 2 is a block diagram illustrating the structure of a transmitter including multiple antennas.

Referring to FIG. 2, a transmitter 200 includes encoders 210-1 to 210-K, modulation mappers 220-1 to 220-K, a layer mapper 230, a precoder 240, resource element mappers 250-1 to 250-K and OFDM signal generators 260-1 to 260-K. In addition, the transmitter 200 includes Nt Tx antennas 270-1 to 270-Nt.

The encoders 210-1 to 210-K encode input data according to a predetermined coding scheme to generate coded data. The modulation mappers 220-1 to 220-K map the coded data to modulation symbols representing positions on a signal constellation. A modulation scheme is not limited and m-phase shift keying (m-PSK) or m-quadrature amplitude modulation (m-QAM) may be used as the modulation scheme. For example, m-PSK may be BPSK, QPSK or 8-PSK and m-QAM may be 16-QAM, 64-QAM or 256-QAM.

The layer mapper 230 defines layers of the modulation symbols such that the precoder 240 may distribute antenna-specific symbols to antenna paths. A layer is defined as an information path connected to the precoder 240. Information path located before the precoder 240 may be a virtual antenna or layer.

The precoder 240 processes the modulation symbols by a MIMO scheme according to the multiple Tx antennas 270-1 to 270-Nt to output antenna-specific symbols. The precoder 240 distributes the antenna-specific symbols to resource element mappers 250-1 to 250-K corresponding to paths of corresponding antennas. An information path assigned to one antenna by the precoder 240 is referred to as a stream. The stream may be referred to as a physical antenna.

The resource element mappers 250-1 to 250-K allocate the antenna-specific symbols to appropriate resource elements and multiplex the same according to user. The OFDM signal generators 260-1 to 260-K modulate the antenna-specific symbols according to OFDM to output OFDM symbols. The OFDM signal generators 260-1 to 260-K may perform inverse fast Fourier transform (IFFT) on the antenna-specific symbols. A cyclic prefix (CP) may be inserted into time-domain symbols obtained through IFFT. The CP is a signal inserted into a guard interval to remove inter-symbol interference due to multiple paths in OFDM transmission. The OFDM symbols are transmitted through the Tx antennas 270-1 to 270-Nt.

The structure of a downlink radio frame will now be described with reference to FIGS. 3 and 4.

In a cellular OFDM wireless packet communication system, uplink/downlink data packet transmission is performed on a subframe-by-subframe basis and one subframe is defined as a predetermined time interval including a plurality of OFDM symbols. 3GPP LTE supports type-1 radio frame applicable to FDD (frequency division duplex) and type-2 radio frame applicable to TDD (time division duplex).

Figure 3:
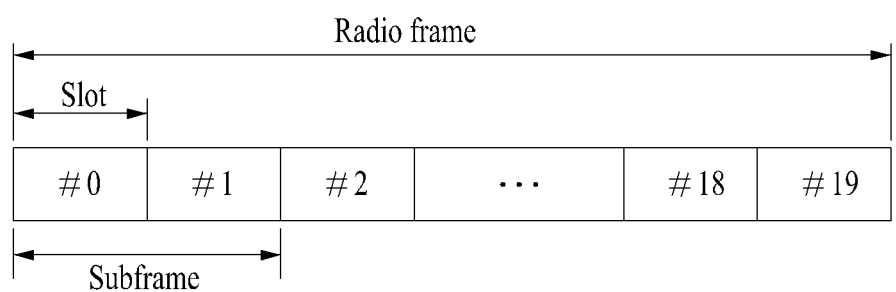
FIG. 3 illustrates the structure of a type-1 radio frame.

FIG. 3 illustrates a type-1 radio frame structure. A downlink radio frame includes 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of OFDM symbols in the time domain and a plurality of resource blocks (RBs) in the frequency domain.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the duration of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP may be used to reduce inter-symbol interference.

When the normal CP is used, one subframe includes 14 OFDM symbols since one slot has 7 OFDM symbols. The first two or three OFDM symbols in each subframe may be allocated to a physical downlink control channel (PDCCH) and the remaining OFDM symbols may be allocated to a physical downlink shared channel (PDSCH).

Figure 4:
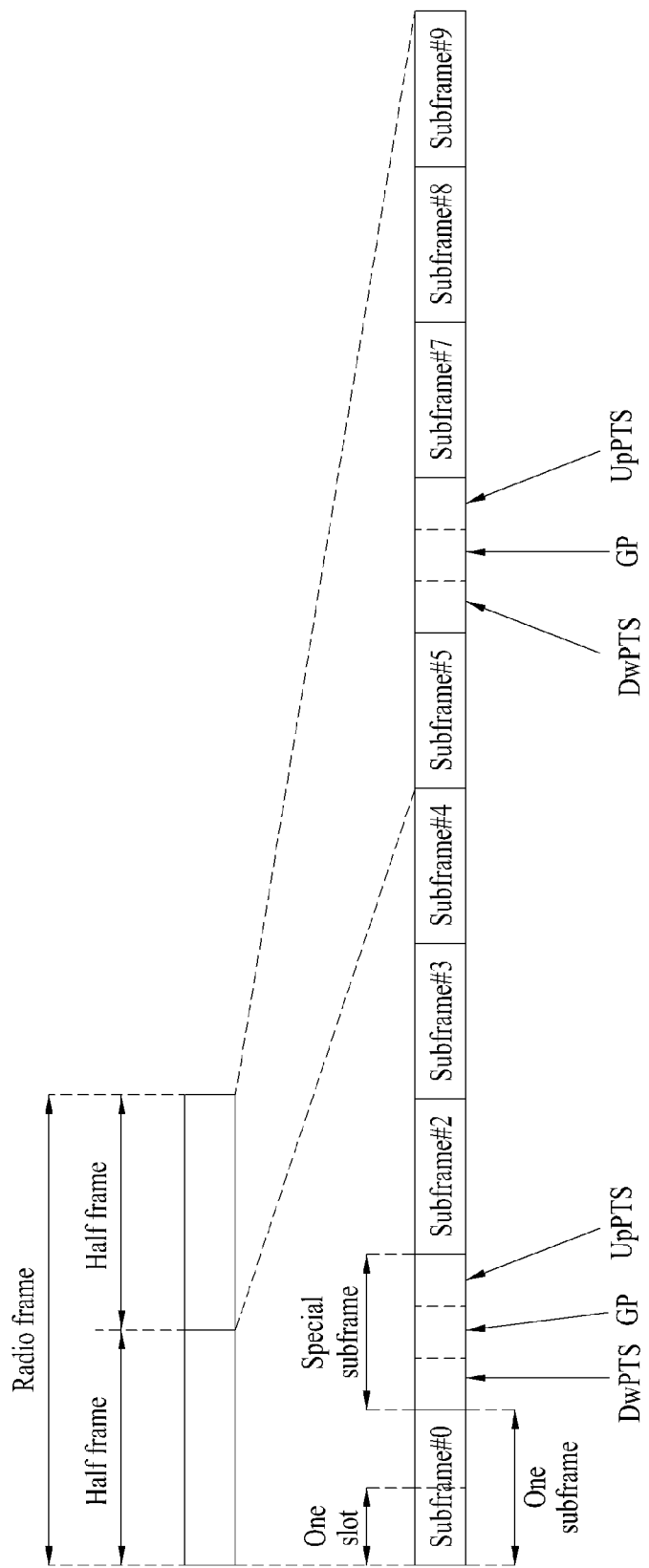
FIG. 4 illustrates the structure of a type-2 radio frame.

FIG. 4 illustrates a type-2 radio frame structure. The type-2 radio frame includes 2 half frames each of which includes 5 subframes. Subframes may be classified into a normal subframe and a special subframe. The special subframe includes three fields of a downlink pilot time slot (DwPTS), a guard period (GP) and an uplink pilot time slot (UpPTS). While the lengths of the three fields may be individually set, the total length thereof needs to be 1 ms. One subframe consists of 2 slots irrespective of radio frame type.

The radio frame structure is purely exemplary and thus the number of subframes in a radio frame, the number of slots in a subframe, or the number of OFDM symbols in a slot may vary.

Figure 5:
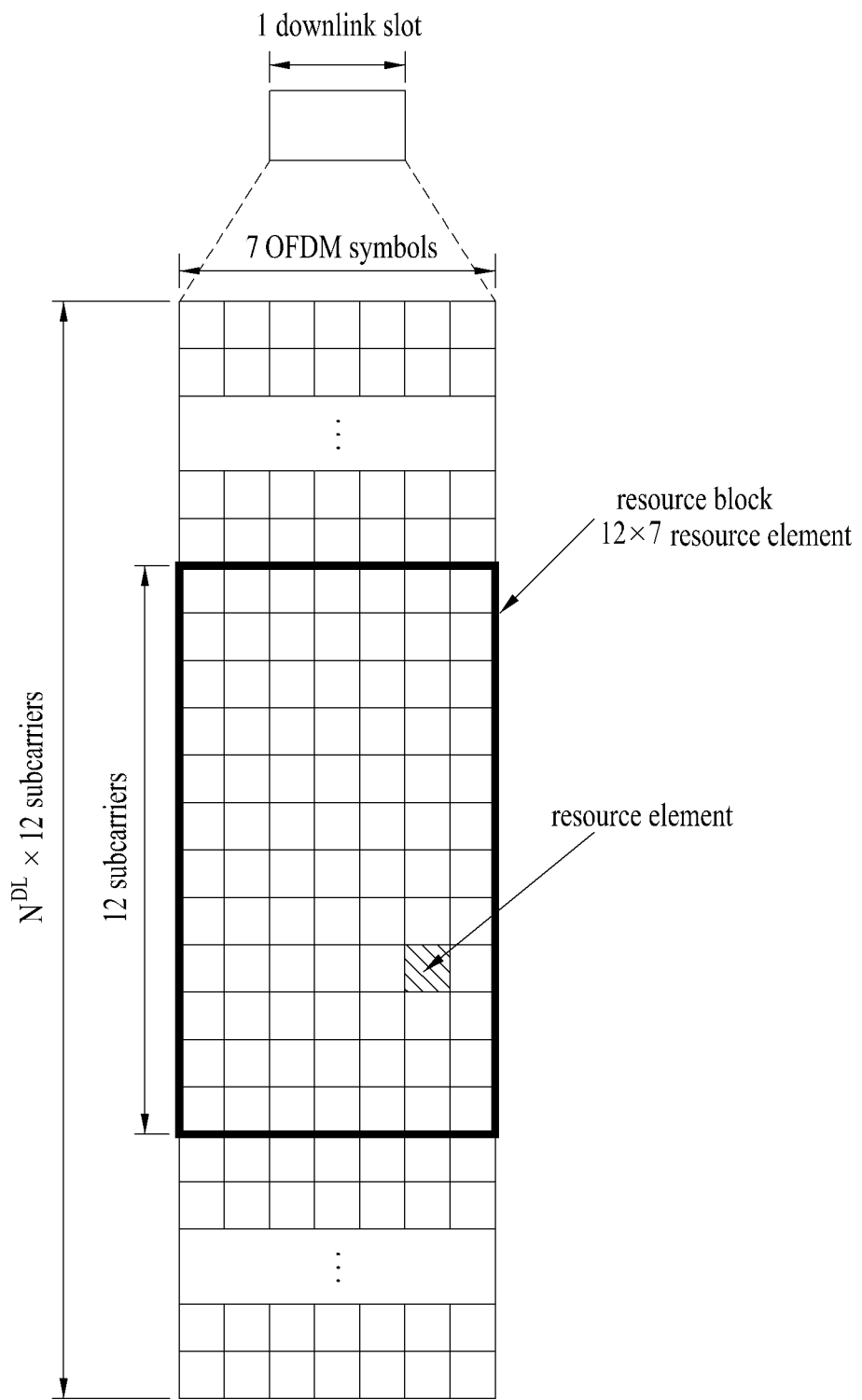
FIG. 5 illustrates an exemplary resource grid of a downlink slot.

FIG. 5 illustrates a resource grid in a downlink slot. FIG. 5 shows OFDM symbols in a normal CP case. Referring to FIG. 5, the downlink slot includes a plurality of OFDM symbols in the time domain and includes a plurality of RBs in the frequency domain. While one downlink slot includes 7 OFDM symbols and one RB includes 12 subcarriers in FIG. 5, the present invention is not limited thereto. Each element on the resource grid is referred to as a resource element (RE). For example, resource element a(k,l) corresponds to the k-th subcarrier and l-th OFDM symbol. One RB includes 12×7 REs in a normal CP case (One RB includes 12×6 REs in an extended CP case. Since spacing of each subcarrier is 15 kHz, one RB corresponds to approximately 180 kHz in the frequency domain. The number $N^{DL}$ of RBs included in the downlink slot depends on a downlink transmit bandwidth set through scheduling of an eNB.

Figure 6:
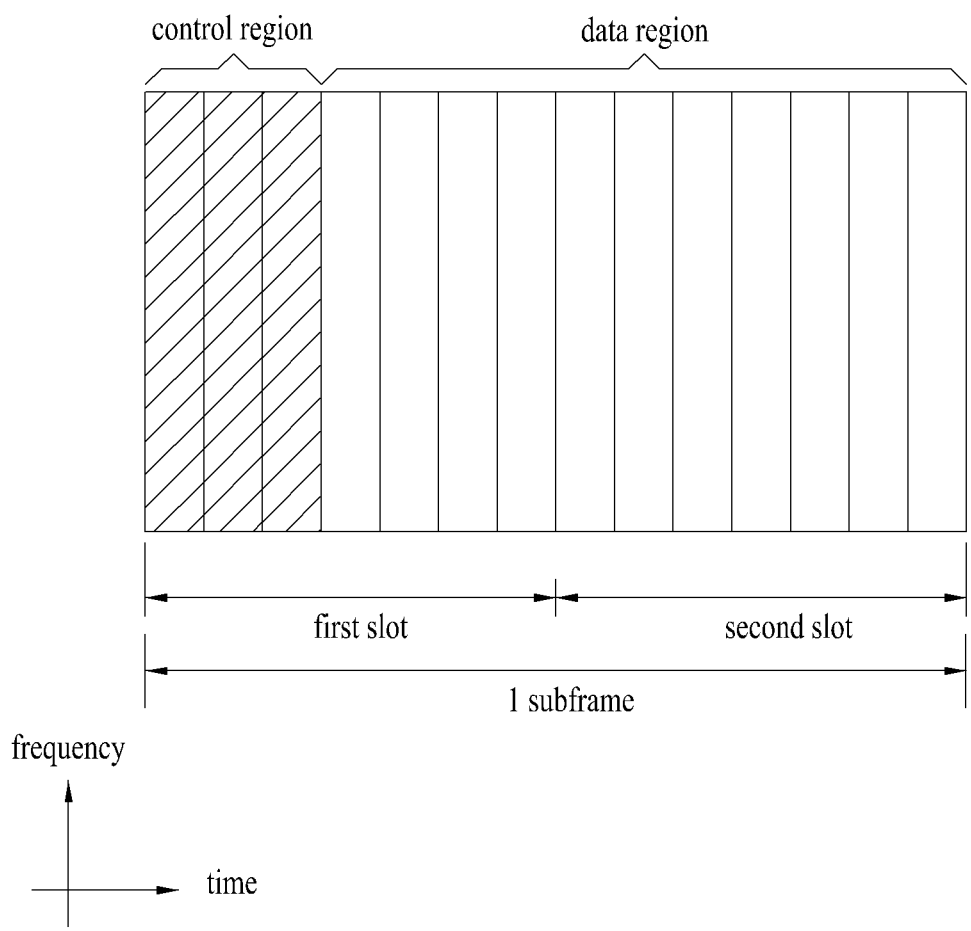
FIG. 6 illustrates the structure of a downlink subframe.

FIG. 6 illustrates a downlink subframe structure. A maximum of three (one, two or three) OFDM symbols located in a front portion of a first slot within a subframe correspond to a control region to which a control channel is allocated. The remaining OFDM symbols correspond to a data region to which a physical downlink shared chancel (PDSCH) is allocated. A basic transmission unit is one subframe. That is, a PDCCH and a PDSCH are allocated to two slots.

Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or uplink Tx power control commands for an arbitrary UE group. The PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs may be transmitted within a control region. The UE may monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with an identifier referred to as a radio network temporary identifier (RNTI) according to an owner or usage of the PDCCH. If the PDCCH is for a specific UE, a cell-RNTI (C-RNTI)) of the UE may be masked to the CRC. Alternatively, when the PDCCH is for a paging message, a paging indicator identifier (P-RNTI) may be masked to the CRC. When the PDCCH is for system information (more specifically, a system information block (SIB)), a system information identifier and system information RNTI (SI-RNTI) may be masked to the CRC. To indicate a random access response corresponding to a response to transmission of a random access preamble of the UE, a random access-RNTI (RA-RNTI) may be masked to the CRC.

Figure 7:
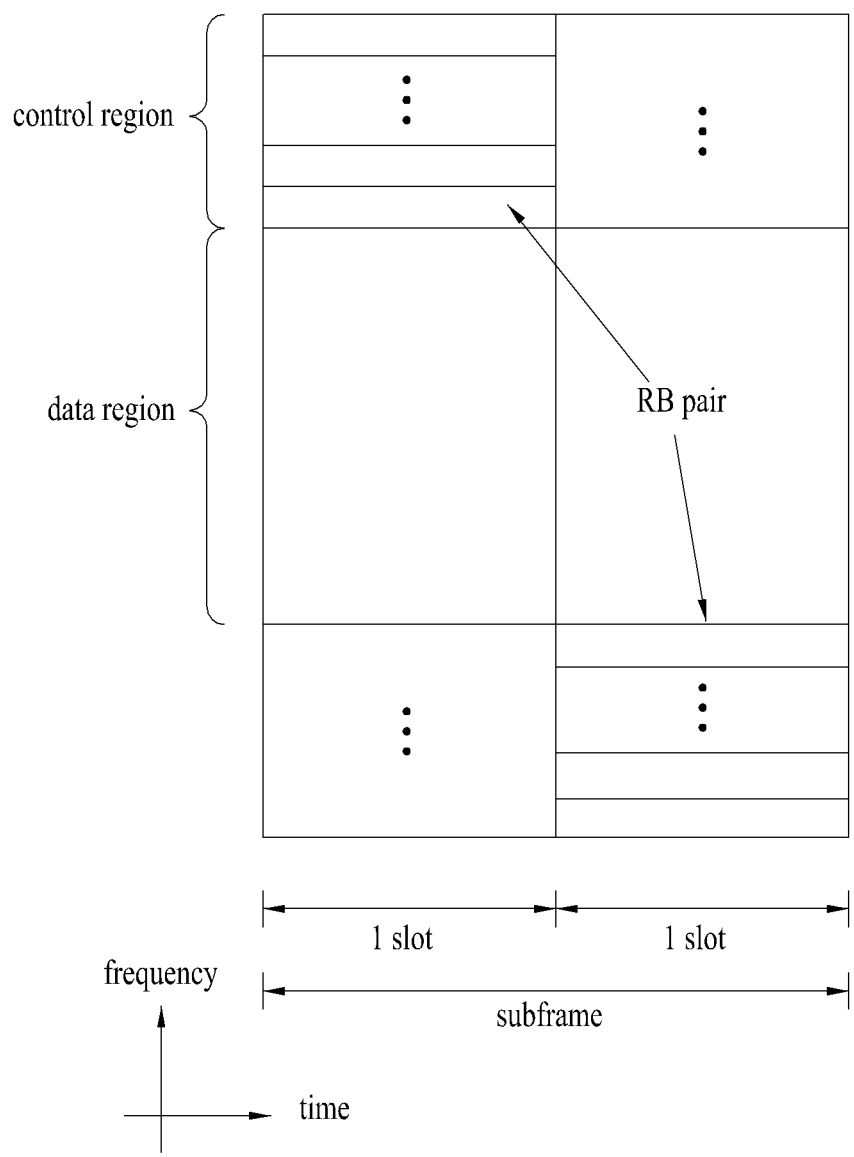
FIG. 7 illustrates the structure of an uplink subframe.

FIG. 7 illustrates an uplink subframe structure. An uplink subframe may be divided into a control region and a data region in the frequency domain. The control region is allocated a PUCCH including uplink control information. The data region is allocated a PUSCH including user data. The PUCCH is used for transmission of ACK/NACK for a PDSCH, transmission of a channel quality indicator (CQI) for frequency domain scheduling and PUSCH transmission resource request (scheduling request). CQI information bits may include one or more fields, for example, a CQI field indicating a CQI index, a PMI (precoding matrix indicator) field indicating an index of a precoding matrix in a codebook, a rank indicator (RI) field indicating a rank, etc.

A PUCCH for a UE is allocated to an RB pair in a subframe. RBs belonging to an RB pair occupy different subcarriers in 2 slots. That is, an RB pair allocated to a PUCCH is frequency-hopped at a slot boundary.

MIMO System

Figure 8:
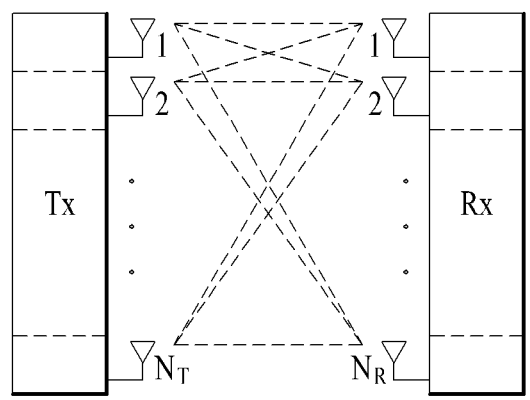
FIG. 8 illustrates a configuration of a wireless communication system including multiple antennas.
Figure 8:
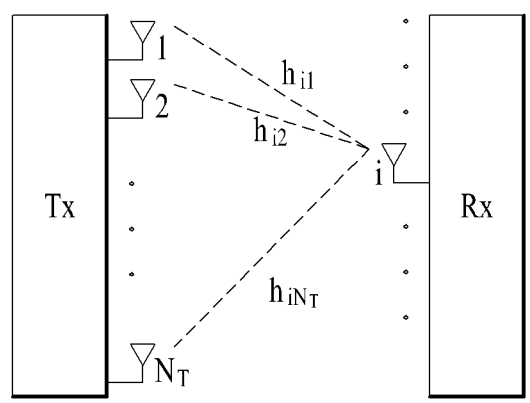

FIG. 8 shows the configuration of a wireless communication system including multiple antennas. Referring to FIG. 8(a), if the number of transmit (Tx) antennas increases to $N_T$, and at the same time the number of receive (Rx) antennas increases to $N_R$, then theoretical channel transmission capacity of the wireless communication system increases in proportion to the number of antennas, differently from a case in which only a transmitter or receiver uses several antennas, so that transmission rate and frequency efficiency may be greatly increased. In this case, the transfer rate acquired by the increasing channel transmission capacity may theoretically increase by a predetermined amount that corresponds to multiplication of a maximum transfer rate ($R_o$) acquired when one antenna is used and a rate of increase ($R_i$). The rate of increase ($R_i$) may be represented by the following equation 1.

$$R_i = \min(N_T, N_R) \qquad \text{[Equation 1]}$$

For example, provided that a MIMO system uses four Tx antennas and four Rx antennas, the MIMO system may theoretically acquire a high transfer rate which is four times higher than that of a single antenna system. After the above-mentioned theoretical capacity increase of the MIMO system was demonstrated in the mid-1990s, many developers began to conduct intensive research into a variety of technologies which may substantially increase data transfer rate using the theoretical capacity increase. Some of the above technologies have been reflected in a variety of wireless communication standards, for example, third-generation mobile communication or next-generation wireless LAN, etc.

A variety of MIMO-associated technologies have been intensively researched by many companies or developers, for example, research into information theory associated with MIMO communication capacity under various channel environments or multiple access environments, research into a radio frequency (RF) channel measurement and modeling of the MIMO system, and research into a space-time signal processing technology.

Mathematical modeling of a communication method for use in the above-mentioned MIMO system will hereinafter be described in detail. As can be seen from FIG. 10(a), it is assumed that there are $N_T$ Tx antennas and $N_R$ Rx antennas. In the case of a transmission signal, a maximum number of transmission information pieces is $N_T$ under the condition that $N_T$ Tx antennas are used, so that the transmission information may be represented by a specific vector shown in the following equation 2.

$$s = [s_1, s_2, \ldots, s_{N_T}]^T \qquad \text{[Equation 2]}$$

In the meantime, individual transmission information pieces $s_1, s_2, \ldots, s_{N_T}$ may have different transmission powers. In this case, if the individual transmission powers are denoted by $P_1, P_2, \ldots, P_{N_T}$, transmission information having an adjusted transmission power may be represented by a specific vector shown in the following equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

In Equation 3, $\hat{s}$ is a transmission vector, and may be represented by the following equation 4 using a diagonal matrix P of a transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

In the meantime, the information vector $\hat{S}$ having an adjusted transmission power is applied to a weight matrix W, so that $N_T$ transmission signals $x_1, x_2, \ldots, x_{N_T}$ to be actually transmitted are configured. In this case, the weight matrix W is adapted to properly distribute transmission information to individual antennas according to transmission channel situations. The above-mentioned transmission signals $x_1, x_2, \ldots, x_{N_T}$ may be represented by the following equation 5 using the vector X.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

Here, $W_{ij}$ denotes a weight corresponding to i-th Tx antenna and j-th information. W represents a weight matrix or precoding matrix.

When $N_R$ Rx antennas are used, received signals $y_1$, $y_2, \ldots, y_{N_R}$ of individual antennas may be represented by a specific vector (y) shown in the following equation 6.

$$y = [y_1, y_2, \ldots, y_{N_R}]^T \qquad \text{[Equation 6]}$$

In the meantime, when channel modeling is executed in the MIMO communication system, individual channels may be distinguished from each other according to Tx/Rx antenna indexes. A specific channel passing the range from a Tx antenna j to a Rx antenna i is denoted by $h_{ij}$. In this case, it should be noted that the index order of the channel $h_{ij}$ is located before a Rx antenna index and is located after a Tx antenna index.

FIG. 8(b) shows channels from $N_T$ Tx antennas to an Rx antenna i. The channels may be tied up to be represented in the form of a vector or matrix. Referring to FIG. 8(b), the channels from the $N_T$ Tx antennas to the Rx antenna i may be represented by the following equation 7.

$$h_i^T = [h_{i1}, h_{i2}, \ldots, h_{iN_T}] \qquad \text{[Equation 7]}$$

All channels from the $N_T$ Tx antennas to $N_R$ Rx antennas may also be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \qquad \text{[Equation 8]}$$

Additive white Gaussian noise (AWGN) is added to an actual channel which has passed the channel matrix H shown in Equation 8. The AWGN $n_1, n_2, \ldots, n_{N_R}$ added to each of $N_R$ Rx antennas may be represented by a specific vector shown in the following equation 9.

$$n = [n_1, n_2, \ldots, n_{N_R}]^T \qquad \text{[Equation 9]}$$

A reception signal calculated by the above-mentioned equations may be represented by the following equation 10.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \qquad \text{[Equation 10]}$$

$$Hx + n$$

In the meantime, the number of rows and the number of columns of a channel matrix H indicating a channel condition are determined by the number of Tx/Rx antennas. In the channel matrix H, the number of rows is equal to the number ($N_R$) of Rx antennas, and the number of columns is equal to the number ($N_T$) of Tx antennas. Namely, the channel matrix H is denoted by an $N_R \times N_T$ matrix.

Generally, a matrix rank is defined by a smaller number between the number of rows and the number of columns, in which the rows and the columns are independent of each other. Therefore, the matrix rank may not be higher than the number of rows or columns. The rank of the channel matrix H may be represented by the following equation 11.

$$\text{rank}(H) \leq \min(N_T, N_R) \qquad \text{[Expression 11]}$$

The rank may be defined as the number of non-zero Eigen values when Eigen value decomposition is performed on the matrix. Similarly, the rank may be defined as the number of non-zero singular values when singular value decomposition is performed on the matrix. Accordingly, the rank of the channel matrix refers to a maximum number of pieces of information that may be transmitted on a given channel.

In description of the specification, "rank" with respect to MIMO transmission indicates the number of paths through which signals may be independently transmitted at specific time in a specific frequency resource and "the number of layers" refers to the number of signal streams transmitted through each path. Since a transmitting end transmits as many layers as the rank used in signal transmission, the rank corresponds to the number of layers unless otherwise mentioned.

Reference Signal (RS)

When a packet is transmitted in a wireless communication system, signal distortion may occur during transmission since the packet is transmitted through a radio channel. To correctly receive a distorted signal at a receiver, distortion of the received signal needs to be corrected using channel information. For channel estimation, a method of transmitting a signal known to both a transmitter and a receiver to detect channel information using a degree of distortion when the signal is received through a channel is generally used. The signal is referred to as a pilot signal or a reference signal.

When data is transmitted and received using multiple antennas, channel state between each Tx antenna and each Rx antenna needs to be recognized in order to receive a correct signal. Accordingly, a reference signal needs to be present per Tx antenna.

Downlink reference signals include a common reference signal (CRS) shared by all UEs in a cell and a dedicated reference signal (DRS) for a specific UE only. Information for channel estimation and demodulation may be provided by the reference signals.

A receiver (UE) may estimate channel state from a CRS and feed back indicators regarding channel quality, such as a channel quality indicator (CQI), a precoding matrix indicator (PMI) and/or a rank indicator (RI), to a transmitter (BS). The CRS may also be referred to as a cell-specific reference signal. A reference signal related to feedback of channel state information (CSI) such as CQI/PMI/RI may be defined as a CSI-RS.

A DRS may be transmitted through a corresponding RE when data on a PDSCH needs to be demodulated. A higher layer may signal presence or absence of the DRS to the corresponding UE and inform the UE that the DRS is valid only when the PDSCH is mapped. The DRS may also be referred to as a UE-specific reference signal or demodulation reference signal (DMRS).

Figure 9:
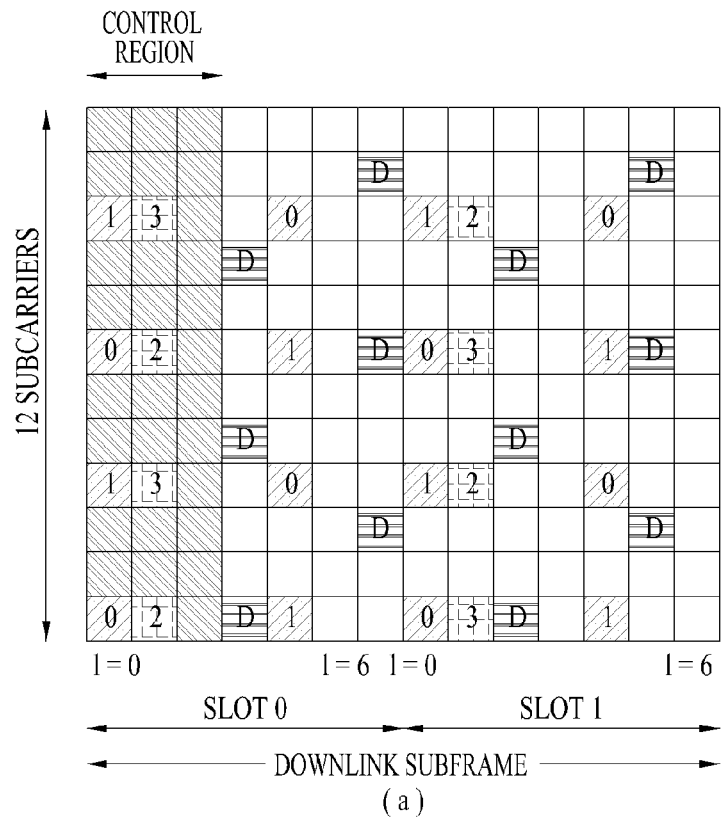
FIG. 9 illustrates reference signal patterns defined in LTE.
Figure 9:
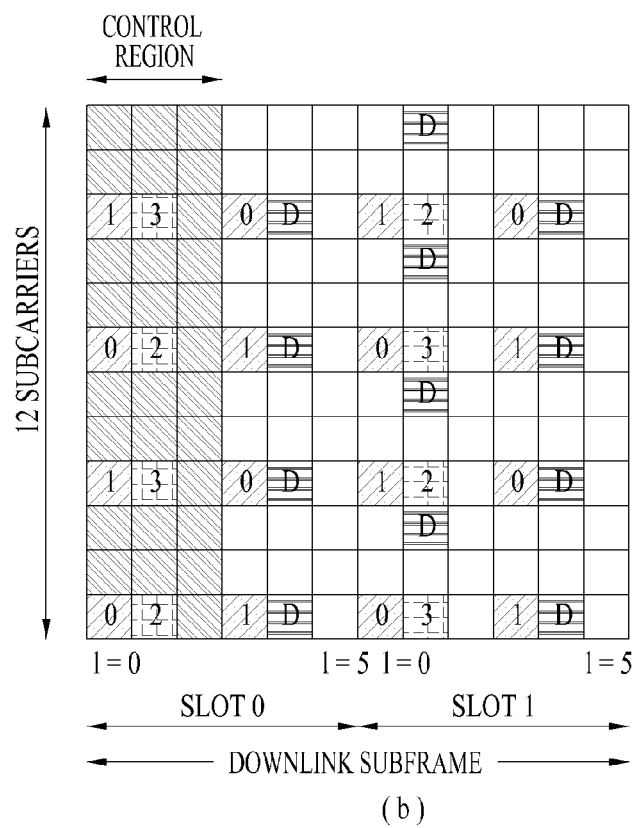

FIG. 9 illustrates patterns in which the CRS and DRS defined in 3GPP LTE (e.g. release-8) are mapped to a downlink RB. A downlink RB, as a unit to which a reference signal is mapped, may be represented as one subframe in the time domain×12 subcarriers in the frequency domain. That is, one RB corresponds to 14 OFDM symbol s in the time domain in a normal CP case (FIG. 9(a)) and to 12 OFDM symbols in an extended CP case (FIG. 9(b)).

FIG. 9 illustrates positions of reference signals on the RB in a system in which a BS supports four Tx antennas. In FIG.

9, REs denoted by 0, 1, 2 and 3 correspond to CRS positions with respect to antenna port indices 0, 1, 2 and 3. REs denoted by D correspond to DRS positions.

CRS will now be described in detail.

CRS is used for estimation of a channel corresponding to a physical antenna and distributed over the entire band as a reference signal that may be commonly received by all UEs in a cell. The CRS may be used for acquisition of CSI and data demodulation.

The CRS is defined in various forms according to antenna configuration of a transmitter (BS). 3GPP LTE (e.g. release-8) supports various antenna configurations and a downlink signal transmitter (BS) has three types of antenna configurations, a single antenna, 2 Tx antennas and 4 Tx antennas. When the BS performs single antenna transmission, a reference signal for a single antenna port is allocated. When the BS performs 2 Tx antenna transmission, reference signals for 2 antenna ports are allocated according to time division multiplexing (TDM) and/or frequency division multiplexing (FDM) scheme. That is, the reference signals for 2 antenna ports are discriminated by being disposed in different time resources and/or different frequency resources. In addition, when the BS supports 4 Tx antenna transmission, reference signals for 4 antenna ports are disposed according to TDM/FDM. Channel information estimated by a downlink signal receiver (UE) through the CRS may be used for demodulation of data transmitted through a transmission scheme such as single antenna transmission, transmit diversity, closed-loop spatial multiplexing, open-loop spatial multiplexing, multi-user MIMO (MU-MIMO), etc.

In MIMO, when a reference signal is transmitted through an antenna port, the reference signal is transmitted in an RE designated for the antenna port according to reference signal pattern and no signal is transmitted in REs designated for other antenna ports.

A rule of mapping CRS to an RB follows Equation 12.

$$k = 6m + (v + v_{shift}) \bmod 6 \quad \text{[Equation 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 12, k is a subcarrier index, l is a symbol index and p is an antenna port index. In addition, $N_{symb}^{DL}$ denotes the number of OFDM symbols in a downlink slot, $N_{RB}^{DL}$ denotes the number of RBs allocated to downlink, $n_s$ is a slot index, $N_{ID}^{cell}$ represents cell ID and mod represents modulo operation. The position of a reference signal in the frequency domain depends on $V_{shift}$. Since $V_{shift}$ depends on cell ID, the reference signal position has a frequency shift value per cell.

Specifically, CRS position in the frequency domain may be shifted such that different CRS positions are provided for respective cells in order to improve channel estimation performance through CRS. For example, when CRS is disposed at intervals of 3 subcarriers, CRS may be disposed in subcarrier 3k for a certain cell and disposed in subcarrier 3k+1 for another cell. A reference signal for an antenna port is disposed at intervals of 6 REs (i.e. 6 subcarriers) in the frequency domain and maintains spacing of 3 REs from an RE in which a reference signal for another antenna port is disposed.

Power boosting is applicable to CRS. Power boosting refers to transmitting a reference signal with higher power using power from REs other than REs allocated for the reference signal from among REs corresponding to a single OFDM symbol.

A reference signal is disposed at specific intervals starting from symbol index #0 of each slot in the time domain. The interval is defined depending on CP length. The reference signal is disposed at symbols corresponding to symbol indices #0 and #4 of a slot in a normal CP case and disposed at symbols corresponding to symbol indices #0 and #3 of the slot in an extended CP case. Accordingly, in case of 4 Tx antenna transmission, reference signals for antenna ports 0 and 1 are disposed at symbols corresponding to symbol indices #0 and #4 (symbol indices #0 and #3 in the extended CP case) of a slot and reference signals for antenna ports 2 and 3 are disposed at a symbol corresponding to symbol index #1 of the slot. However, positions of frequencies of reference signals for antenna ports 2 and 3 are switched in the second slot.

To support spectral efficiency higher than that of 3GPP LTE (e.g. release-8), a system (e.g. LTE-A) having an extended antenna configuration may be designed. The extended antenna configuration may be an 8 Tx antenna configuration, for example. The system having the extended antenna configuration needs to support UEs operating with legacy antenna configurations, that is, backward compatibility. Accordingly, it is necessary to support reference signal patterns according to the legacy antenna configurations and to design a new reference signal pattern for an additional antenna configuration. Here, when a CRS for a new antenna port is added to a system having the legacy antenna configurations, reference signal overhead remarkably increases to decrease data transfer rate. In view of this, an additional reference signal (CSI-RS) for CSI measurement for a new antenna port may be introduced to LTE-A.

DRS will now be described in detail.

DRS (or a UE-specific reference signal) is used for data demodulation. A precoding weight used for a specific UE during multi-antenna transmission is applied to DRS such that the UE may estimate an equivalent channel corresponding to a combination of the precoding weight transmitted from each Tx antenna and a transport channel upon reception of the DRS.

3GPP LTE (e.g. release-8) supports transmission of up to 4 Tx antennas and defines a DRS for rank-1 beamforming. The DRS for rank-1 beamforming may be represented as a reference signal for antenna port index #5. A rule of mapping DRS to an RB follows Equations 13 and 14. Equation 13 corresponds to a normal CP case and Equation 14 corresponds to an extended CP case.

$$k = (k')\bmod N_{sc}^{RB} + N_{sc}^{RB} \cdot n_{PRB} \quad \text{[Equation 13]}$$

$$k' = \begin{cases} 4m' + v_{shift} & \text{if } l \in \{2, 3\} \\ 4m' + (2 + v_{shift})\bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k')\bmod N_{sc}^{RB} + N_{sc}^{RB} \cdot n_{PRB} \quad \text{[Equation 14]}$$

$$k' = \begin{cases} 3m' + v_{shift} & \text{if } l = 4 \\ 3m' + (2 + v_{shift})\bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 13 and 14, k is a subcarrier index, l is a symbol index and p is an antenna port index. In addition, $N_{SC}^{RB}$ denotes an RB size in the frequency domain and represents the number of subcarriers, $n_{PRB}$ denotes a physical resource block number and $N_{RB}^{PDSCH}$ represents the bandwidth of an RB for corresponding PDSCH transmission. Furthermore, $n_s$ is a slot index, $N_{ID}^{cell}$ denotes cell ID and mod represents modulo operation. The position of a reference signal in the frequency domain depends on $V_{shift}$. Since $V_{shift}$ depends on cell ID, a reference signal position has a frequency shift value per cell.

LTE-A may support up to 8 Tx antennas on downlink. Accordingly, RSs for up to 8 Tx antennas need to be supported. In LTE, downlink RS is defined for up to 4 antenna ports only in LTE. Accordingly, when a BS has 4 to 8 downlink Tx antennas in an LTE-A system, RSs for antenna ports of the Tx antennas need to be additionally defined. Both an RS for channel measurement and an RS for data modulation need to be considered as RSs for up to 8 Tx antenna ports.

One important factor in design of an LTE-A system is backward compatibility. Backward compatibility means supporting legacy LTE UEs so that such UEs correctly operate in LTE-A. In terms of RS transmission, when RSs for up to 8 Tx antenna ports are added to a time-frequency region in which CRS defined in LTE is transmitted over the entire bandwidth per subframe, RS overhead excessively increases. Accordingly, it is necessary to reduce RS overhead in design of new RSs for up to 8 antenna ports.

RSs newly introduced to LTE-A may be classified into two categories. One category is a demodulation RS (DMRS) used to demodulate data transmitted through up to 8 Tx antennas. If data is transmitted in a certain downlink subframe, then DMRS is transmitted to a UE scheduled to perform data transmission. DMRS dedicated for a specific UE may be designed such that the same is transmitted only in a resource region for which the UE is scheduled, that is, a time-frequency region in which data for the UE is transmitted. The other RS is a CSI-RS for channel measurement for selecting a transport rank, a modulation and coding scheme (MCS) and a PMI.

The CSI-RS is designed mainly for channel measurement, differently from CRS in LTE, which is used for measurement such as channel measurement and handover and at the same time for data demodulation. The CSI-RS may also be used for measurement such as handover. Since the CSI-RS is transmitted only in order to obtain information about channel state, the CSI-RS need not be transmitted per subframe, differently from CRS in LTE. Accordingly, the CSI-RS may be designed such that the same is intermittently (e.g. periodically) transmitted in the time domain to reduce overhead.

Figure 10:
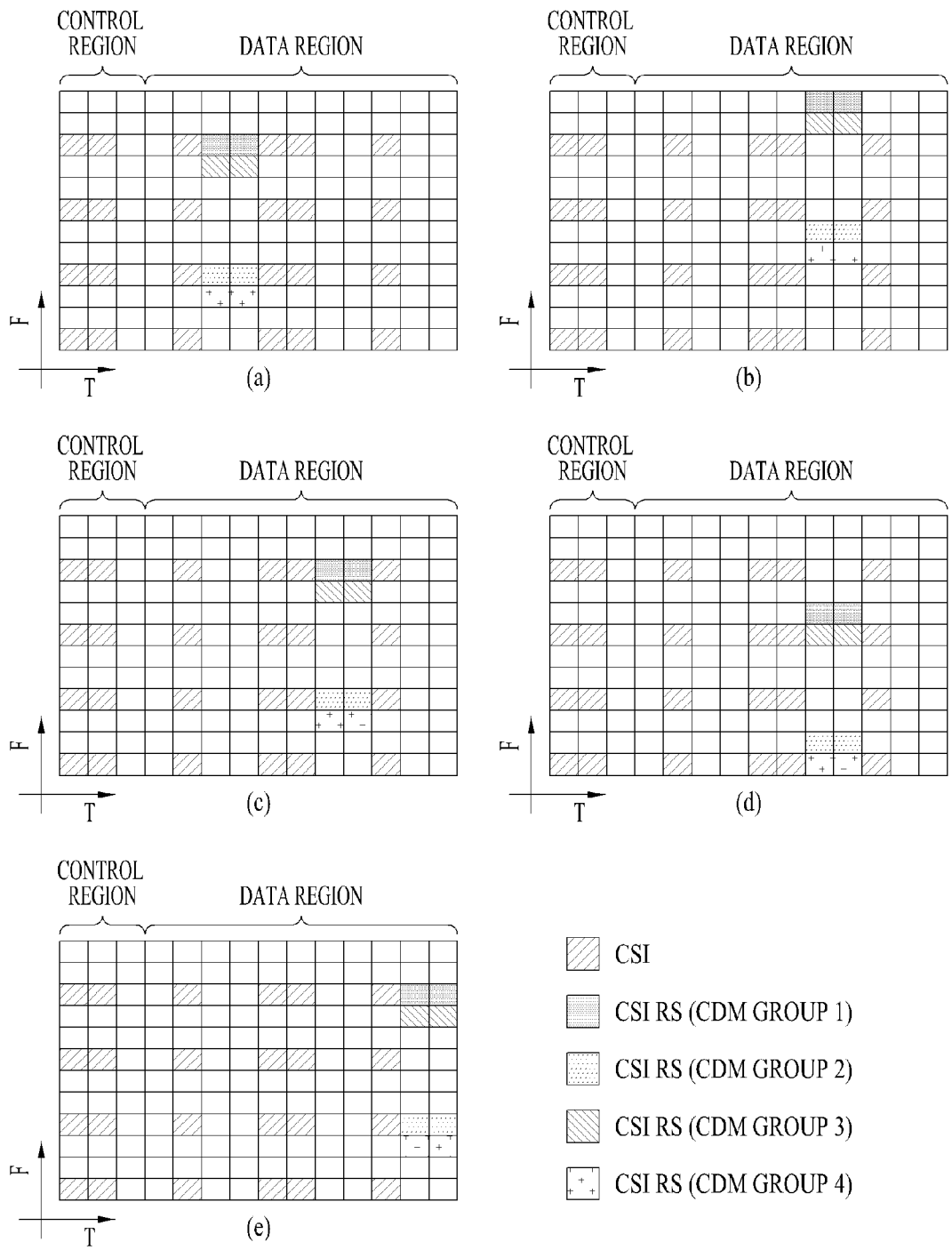
FIG. 10 illustrates exemplary CSI-RS patterns defined in LTE-A.

FIG. 10 illustrates exemplary CSI-RS patterns defined in LTE-A. FIG. 10 shows positions of REs in which CSI-RS is transmitted on one RB (14 OFDM symbols in the time domain×12 subcarriers in the frequency domain in a normal CP case) through which downlink data is transmitted. One of the CSI-RS patterns shown in FIGS. 10(a) to 10(e) may be used in a downlink subframe. The CSI-RS may be transmitted for 8 antenna ports (corresponding to antenna port indices #15 to #22) additionally defined in LTE-A. CSI-RSs for different antenna ports may be discriminated by being disposed in different frequency resources (subcarriers) and/or different time resources (OFDM symbols) (i.e. multiplexed according to FDM and/or TDM). In addition, CSI-RSs for different antenna ports, which are disposed in the same time-frequency resource, may be discriminated by different orthogonal codes (i.e. multiplexed according to CDM). CSI-RSs for antenna ports #15 and #16 may be disposed in REs belonging to CSI-RS group 1 in the example of FIG. 10(a) and multiplexed by orthogonal codes. CSI-RSs for antenna ports #17 and #18 may be disposed in REs belonging to CSI-RS group 2 in the example of FIG. 10(a) and multiplexed by orthogonal codes. CSI-RSs for antenna ports #19 and #20 may be disposed in REs belonging to CSI-RS group 3 in the example of FIG. 10(a) and multiplexed by orthogonal codes. CSI-RSs for antenna ports #21 and #22 may be disposed in REs belonging to CSI-RS group 4 in the example of FIG. 10(a) and multiplexed by orthogonal codes. The principle described with reference to FIG. 10(a) is equally applicable to FIGS. 10(b) to 10(e).

The RS patterns illustrated in FIGS. 9 and 10 are exemplary and are not limited to specific patterns in application of various embodiments of the present invention. That is, various embodiments of the present invention may be equally applied even when RS patterns different from those shown in FIGS. 9 and 10 are defined and used.

CSI Feedback

To correctly perform MIMO, a receiver may feed back an RI, PMI and CQI to a transmitter. The RI, PMI and CQI may be collectively referred to as CSI. To generate and calculate CSI, the receiver may estimate a channel using a reference signal (CRS or SCI-RS) from the transmitter.

RI is information on a channel rank. The channel rank denotes a maximum number of layers through which different pieces of information may be transmitted. RI is determined on the basis of the number of allocated transport layers and may be obtained from related DCI.

PMI is information on a precoding matrix used for transmission from the transmitter. Precoding refers to mapping of a transport layer to a Tx antenna and a layer-antenna mapping relationship may be determined by a precoding matrix. To reduce precoding information feedback overhead, the transmitter and the receiver may previously share a codebook including various precoding matrices and only an index indicating a specific precoding matrix in the codebook may be fed back.

CQI is information indicating channel quality. CQI may be represented by a predetermined MCS combination. That is, a fed back CQI indicates a corresponding modulation scheme and code rate.

A detailed method through which a UE feeds back CSI through an uplink control channel is referred to as CSI configuration. For example, CSI configuration information includes a CSI feedback time, period, offset, order, channel, etc.

Figure 11:
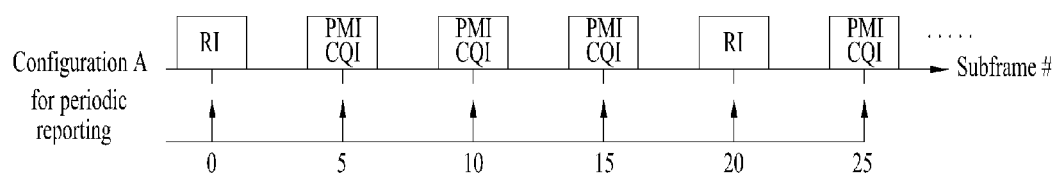
FIG. 11 illustrates an example of CSI feedback in a non-CoMP system.

FIG. 11 illustrates an example of CSI feedback in a non-CoMP system. Specifically, FIG. 11 shows an example in which a UE feeds back CSI using containers of PUCCH format 2 at intervals of 5 ms. According to CSI configuration information of FIG. 11, CSI is fed back in such a manner that an RI is transmitted in the first container and a PMI and CQI are transmitted in the second to fourth containers.

In the meantime, new CSI is applicable to a system (e.g. LTE-A) supporting extended antenna configurations. For example, precoding information fed back by a receiver may be indicated by a combination of two PMIs. One (first PMI) of the two PMIs may be referred to as W1 (or second type PMI) and the other (second PMI) may be referred to as W2 (or first type PMI). A final PMI may be determined by a combination (or function) of W1 and W2. For example, if the final PMI is W, then, W=W1*W2 or W=W2*W1.

RI and W1 reflect average characteristics of a channel in the frequency or time domain. In other words, RI and W1 may reflect wideband channel characteristics in the frequency domain and long-term channel characteristics in the time domain. To simply represent the characteristics of RI and W1, RI and W1 are referred to as long-term wideband CSI in the specification. That is, long-term wideband CSI refers to CSI reflecting long-term channel characteristics in the time domain, CSI reflecting wideband channel characteristics in the frequency domain or CSI simultaneously reflecting long-term channel characteristics in the time domain and wideband channel characteristics in the frequency domain in the specification.

W2 and CQI are determined on the basis of RI and W1 and reflect relatively instantaneous channel characteristics as compared to RI and W1. In other words, W2 and CQI may reflect subband channel characteristics in the frequency domain and short-term channel characteristics in the time domain. To simply represent the characteristics of W2 and CQI, W2 and CQI are referred to as short-term subband CSI in the specification. That is, short-term subband CSI refers to CSI reflecting short-term channel characteristics in the time domain, CSI reflecting subband channel characteristics in the frequency domain or CSI simultaneously reflecting short-term channel characteristics in the time domain and subband channel characteristics in the frequency domain in the specification.

In LTE-A, CSI may include RI, W1, W2 and CQI, as described above. Accordingly, it is necessary to define a new scheme for transmitting and receiving feedback information. A description will be given of embodiments of the present invention related to the new transmission/reception scheme.

CSI Feedback in a CoMP System

In a CoMP system, a UE may receive downlink channels from multiple cells and feed back CSI on a downlink channel from each cell. In the following, a cell that participates or may participate in CoMP operation is referred to as a CoMP cell. In addition, a UE that performs or may perform transmission and reception according to CoMP operation is referred to as a CoMP UE. While the number of cells participating in CoMP operation is 2 in the following for convenience of description, the scope of the present invention is not limited thereto and the principle of the present invention is equally applicable to a case in which 3 or more CoMP cells are present.

Figure 12:
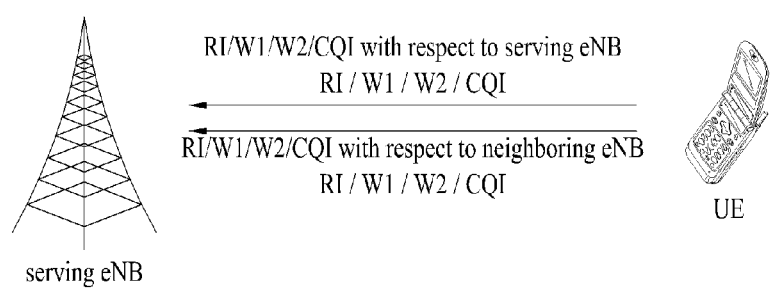
FIG. 12 illustrates an example of CSI feedback in a CoMP system.

FIG. 12 illustrates an example of CSI feedback in a CoMP system. When a UE feeds back CSI on each CoMP cell, the UE may transmit CSI on a neighboring cell (or neighboring eNB) participating in CoMP operation using the same method as a method of transmitting CSI on a serving cell. For example, if a single neighboring cell participates in CoMP operation, then the CoMP UE may calculate CSI in the same format for the serving cell and the neighboring cell and feed back the same. When a radio channel is present between the CoMP UE and a neighboring cell, the CoMP UE may directly feed back CSI on the neighboring cell to the neighboring cell. Otherwise, a UE served by the serving cell may feed back CSI (RI, W1, W2 and CQI) on a neighboring cell to the serving cell, as shown in FIG. 12. In this case, the CSI fed back by the UE may be shared by cells through a backhaul link.

Figure 13:
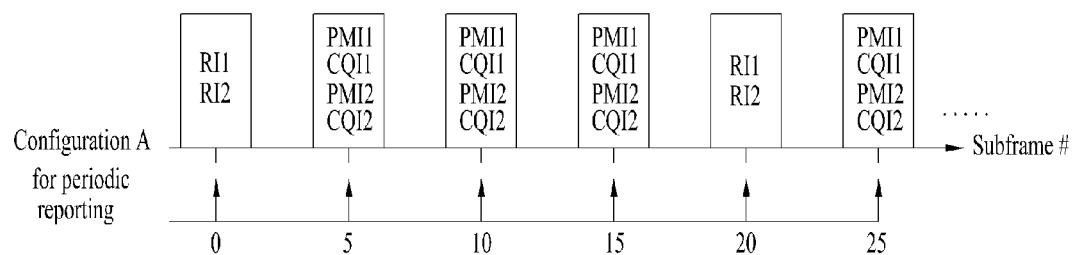
FIG. 13 illustrates an example of CSI feedback with an increased container payload size.
Figure 14:
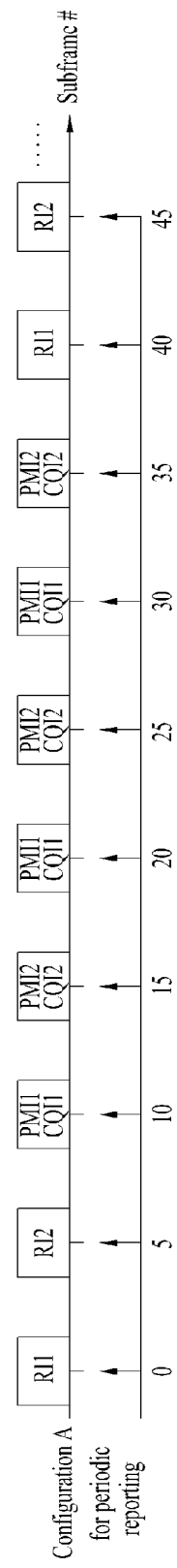
FIG. 14 illustrates an example of CSI feedback in which CSI on a serving cell and CSI on a neighboring cell are alternately transmitted.

Here, the UE feeds back CSI on a neighboring cell as well as CSI on the serving cell in the CoMP system and thus payload increases. Therefore, the UE may feed back CSI by improving the feedback method according to CSI configuration information, as illustrated in FIG. 11. For example, the UE may feed back CSI according to a configuration in which a container payload size is increased, as illustrated in FIG. 13, in the CoMP system. Referring to FIG. 13, the UE may simultaneously transmit the CSI on the serving cell and the CSI on the neighboring cell according to the configuration in which the container payload size is increased. For instance, the UE may feed back CSI using a PUCCH format 3 container having a larger payload size than a PUCCH format 2 container used in a non-CoMP system. In addition, the UE may feed back CSI according to a configuration in which the CSI on the serving cell and the CSI on the neighboring cell are alternately transmitted, as illustrated in FIG. 14, in the CoMP system. Referring to FIG. 14, the UE may transmit the CSI (RI1, PMI1 and CQI1) on the serving cell in an odd-numbered container and transmit the CSI (RI2, PMI2 and CQI2) on the neighboring cell in an even-numbered container. Furthermore, various CSI configurations for feedback of the CSI on the serving cell and neighboring cell are applicable to the present invention.

When the same CSI is fed back for CoMP cells in the CoMP system, CSI feedback overhead increases according to the number of CoMP cells. In this case, the quantity of resources that can be used for the UE to transmit data, from among resources that can be used for the UE for transmission to eNBs, decreases as overhead with respect to control signals increases. Accordingly, an efficient CSI transmission method for reducing feedback overhead while accomplishing sufficient CSI accuracy is applied. For example, the UE may drop W2 with respect to the neighboring cell or the serving cell during feedback of CSI on each CoMP cell. In this case, feedback overhead may be reduced since W2 is not transmitted while quantization error may increase as compared to a PMI composed of both W1 and W2. Alternatively, feedback overhead may be additionally reduced by restricting the RI with respect to the neighboring cell, fed back by the UE, (for example, by fixing the RI to 1 or setting the RI to the same value as RI with respect to the serving cell).

Additional Feedback Information of CoMP System

A feedback method in a CoMP system according to an embodiment of the present invention may transmit muting point information as additional feedback information in addition to CSI described with reference to FIG. 12.

The muting point information is information about an eNB that does not transmit a signal (does not participate in CoMP transmission) to mitigate interference from among eNBs participating in CoMP transmission. For example, if CoMP performance is improved when a third eNB from among the first, second and third eNBs participating in CoMP operation does not transmit a signal, then the UE may transmit information indicating the third eNB as a preferred muting eNB to the eNBs. A network may determine an eNB that does not participate in CoMP transmission on the basis of the muting point information. While feedback overhead increases as the number of eNBs participating in CoMP operation increases, capacity of channels on which feedback information can be transmitted is limited and thus the UE may not transmit sufficient feedback information. Accordingly, CoMP system performance may be improved by designating a specific eNB as a muting point.

Figure 15:
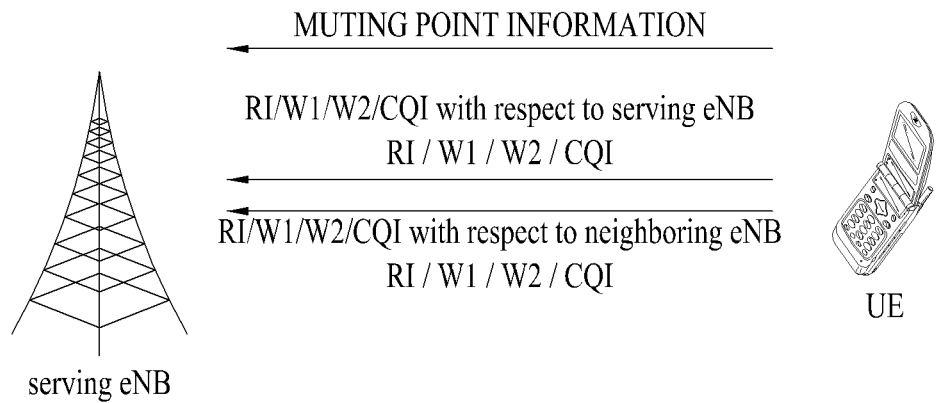
FIG. 15 illustrates an example of transmitting muting point information as additional feedback information.

FIG. 15 illustrates an example of transmitting muting point information as additional feedback information. Referring to FIG. 15, the UE may respectively feed back CSI (RI, PMI and CQI) to a plurality of CoMP eNBs and transmit muting point information indicating some of the CoMP eNBs as muting points. The UE may reduce feedback overhead by feeding back CSI only to an eNB that is not a preferred muting point from among the plurality of CoMP eNBs.

A description will be given of a method for transmitting muting point information as additional feedback information.

Figure 16:
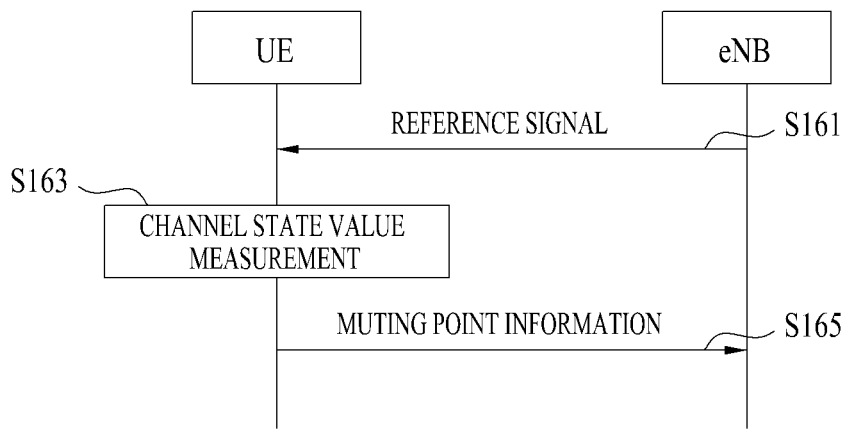
FIG. 16 is a flowchart illustrating an exemplary feedback method according to an embodiment of the present invention.

FIG. 16 is a flowchart illustrating an exemplary feedback method according to an embodiment of the present invention.

A UE receives reference signals from a plurality of eNBs capable of participating in CoMP operation (S161). The reference signal has been described above and thus description thereof is omitted.

Then, the UE measures channel state values with respect to the plurality of eNBs on the basis of the received reference signals (S163). The channel state values indicate channel states of the eNBs and may be a signal-to-interference-plus-noise ratio (SINR), for example.

The UE transmits, to the eNB, muting point information indicating a preferred eNB that does not participates in CoMP transmission from among the plurality of eNBs (S165).

Here, the UE may feed back the muting point information using bit mapping. For example, when N serving eNBs are present, the number of cases in which at least one of N−1 serving eNBs is muted may be mapped to Nb bits. The number Nb of bits may be represented by Equation 15.

$$Nb = \left\lceil \log_2 \sum_{i=1}^{n-1} (n \, C \, i) \right\rceil \quad \text{[Equation 15]}$$

In Equation 15, C represents combination. The UE may transmit the muting point information using bit mapping. Here, the maximum number of muting points may be restricted in order to reduce overhead of information using bit mapping. For example, when the maximum number of muting points is limited to M (M being a natural number less than or equal to N−1), the required number of bits can be represented as follows.

$$Nb = \left\lceil \log_2 \sum_{i=1}^{m} (n \, C \, i) \right\rceil \quad \text{[Equation 16]}$$

To reduce overhead of information using bit mapping, the number of muting points may be limited to P (P being a natural number less than or equal to N−1). For example, when the number of muting points is limited to M, the required number of bits can be represented as follows.

$$Nb = \lceil \log_2(nCp) \rceil \quad \text{[Equation 17]}$$

Figure 17:
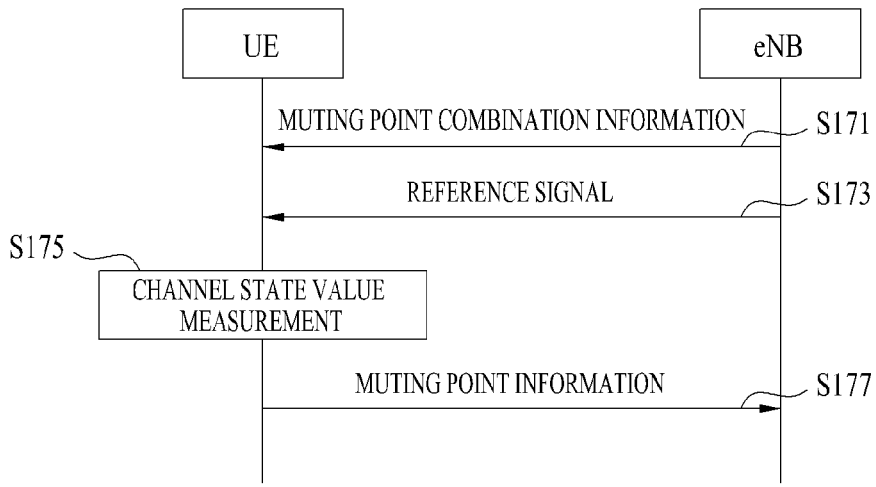
FIG. 17 is a flowchart illustrating another exemplary feedback method according to an embodiment of the present invention.

FIG. 17 is a flowchart illustrating an exemplary feedback method according to another embodiment of the present invention.

Referring to FIG. 17, the UE receives information on predetermined muting point combinations from each eNB through a radio resource control (RRC) signal (S171). That is, the UE may perform feedback with relatively small overhead by transmitting information for selecting one of the muting point combinations included in the muting point combination information. The muting point combinations may be determined in consideration of the positions of the UE, a serving eNB and a neighboring eNB.

The UE receives a reference signal from each eNB (S173) and measures a channel state value on the basis of the received reference signal (S175). Steps S173 and S175 correspond to steps S161 and S163 of FIG. 16 and thus detailed description thereof is omitted.

Subsequently, the UE determines a muting point on the basis of the measured channel state value. The UE may select one of the muting point combinations received from the eNB and feed back the selected one to the eNB.

Figure 18:
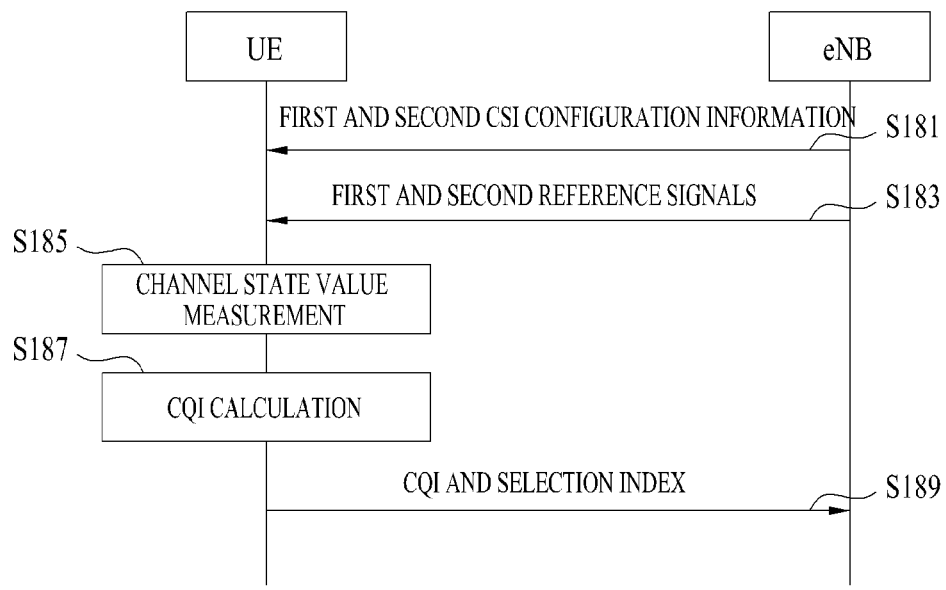
FIG. 18 is a flowchart illustrating another exemplary feedback method according to an embodiment of the present invention.

FIG. 18 is a flowchart illustrating an exemplary feedback method according to another embodiment of the present invention. In the present embodiment, the UE may indirectly feed back muting point information on the basis of first and second (or more) CSI configuration information received from the eNB.

Referring to FIG. 18, the UE receives the first and second CSI configuration information for measurement of different interference environments from the eNB (S181). For example, the UE may receive the first and second CSI configuration information based on whether a muting point is applied from the eNB. The first CSI configuration information is information with respect to a case in which interference from a plurality of neighboring cells capable of participating in CoMP operation is present. The second CSI configuration information is information with respect to a case in which interference from neighboring cells except for at least one of the plurality of neighboring cells capable of participating in CoMP operation is present. While the eNB knows whether a muting point is applied according to the first and second CSI configuration information, the UE indirectly feeds back muting point information through the following procedure according to the first and second CSI configuration information.

The UE receives first and second reference signals according to the first and second CSI configuration information, respectively (S183). The first and second reference signals may be disposed in different subframes or different resource elements and transmitted to the UE.

Then, the UE measures a first channel state value to which the muting point is not applied and a second channel state to which the muting point is applied using the first and second reference signals received according to the first and second CSI configuration information (S185). The channel state values may be SINR.

Subsequently, the UE calculates CSI (e.g. CQI) on the basis of one of the first and second channel state values (S187). Here, the UE may select one of the first and second channel state values using a muting reference value. For example, the UE calculates CSI on the basis of the second channel state value when a difference obtained by subtracting the first channel state value from the second channel state value is greater than the muting reference value. That is, the muting reference value is a basis for determination of whether SINR gain obtained when the muting point is applied is sufficiently large. When the difference is less than the muting reference value, the UE calculates CSI on the basis of the first channel state value to which the muting point is not applied.

The UE transmits, to the eNB, the CSI and a selection index indicating which one of the first and second reference signals is used to calculate the CSI (S189). That is, the UE may indirectly feed back the muting point information to the eNB by transmitting the selected one of the first and second channel state values corresponding to the first and second CSI configuration information and the selection index. The eNB that has transmitted the first and second CSI configuration information in step S181 is indirectly provided with muting point information feedback by receiving the selection index.

The UE may feed back muting point information using resources saved according to the aforementioned CSI feedback overhead reduction method. For example, the UE may fix RI of a neighboring cell to 1 or set the RI to the same value as RI of the serving cell to save resources and feed back muting point information.

When the UE feeds back the muting point information, the UE may apply one of the following methods as an SINR calculation method for CQI calculation. The UE may calculate SINR by excluding interference generated from a muting point from entire interference signal power. Otherwise, the UE may calculate SINR on the basis of the entire interference signal power. Furthermore, the UE may use a difference between SINR calculated on the basis of the entire interference signal power and SINR calculated by excluding interference generated from the muting point from the entire interference signal power.

Figure 19:
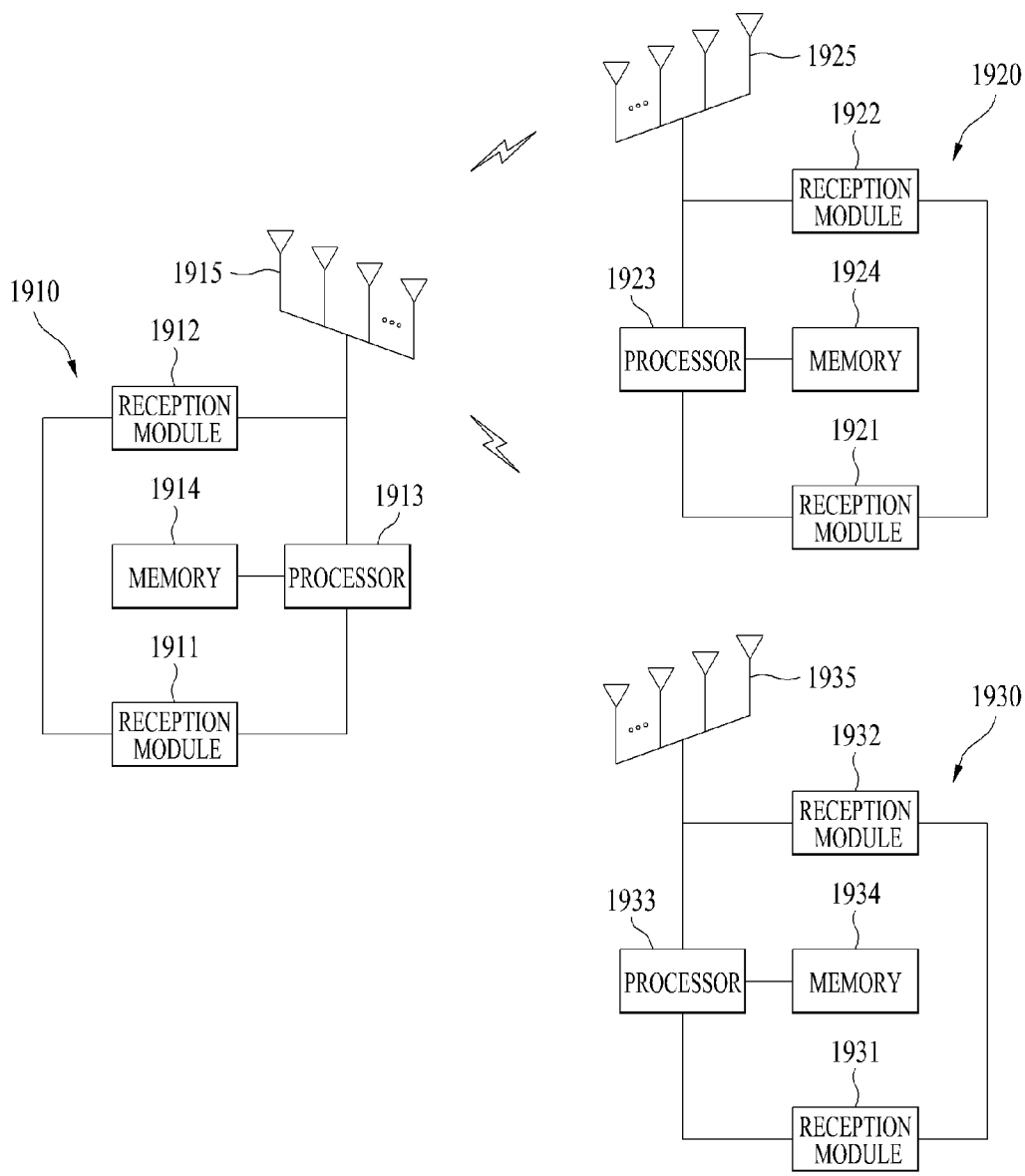
FIG. 19 illustrates configurations of a UE and an eNB according to an embodiment of the present invention.

FIG. 19 illustrates configurations of a UE and an eNB according to the present invention.

Referring to FIG. 19, a UE 1910 according to an embodiment of the present invention may include a reception module 1911, a transmission module 1912, a processor 1913, a memory 1914 and a plurality of antennas 1915. The antennas 1915 represent that the UE 1910 supports MIMO transmission and reception. The reception module 1911 may receive signals, data and information from an eNB on downlink. The transmission module 1912 may transmit signals, data and information to the eNB on uplink. The processor 1913 may control overall operation of the UE 1910.

The UE 1910 according to an embodiment of the present invention may be configured to feed back muting point information. The processor 1913 of the UE 1910 may be configured to receive, through the reception module 1911, reference signals for CSI feedback from a plurality of eNBs 1920 and 1930. In addition, the processor 1913 may be configured to measure channel state values with respect to the plurality of eNBs 1920 and 1930 on the basis of the reference signals. Furthermore, the processor 1913 may be configured to transmit, through the transmission module 1912, muting point information that is determined on the basis of channel state values and indicates a preferred eNB that does not participate in CoMP transmission from among the plurality of eNBs 1920 and 1930.

The processor 1913 of the UE 1910 may process information received by the UE 1910, information transmitted from the UE 1910 to the outside, etc. The memory 1914 may store processed information for a predetermined time and may be replaced by a component such as a buffer (not shown).

Referring to FIG. 19, the first eNB 1920 according to an embodiment of the present invention may include a reception module 1921, a transmission module 1922, a processor 1923, a memory 1924 and a plurality of antennas 1925. The antennas 1925 represent that the first eNB supports MIMO transmission and reception. The reception module 1921 may receive signals, data and information from the UE 1910 on uplink and receive inter-eNB information from the other eNB 1930. The transmission module 1922 may transmit signals, data and information to the UE 1910 on downlink and transmit inter-eNB information to the other eNB 1930. The processor 1923 may control overall operation of the eNB 1920.

The first eNB 1920 according to an embodiment of the present invention may be configured to support CoMP communication.

In addition, the processor 1923 of the first eNB 1920 may process information received by the first eNB 1920, information transmitted from the first eNB 1920 to the outside, etc. The memory 1924 may store processed information for a predetermined time and may be replaced by a component such as a buffer (not shown).

Referring to FIG. 19, the second eNB 1930 according to an embodiment of the present invention may include a reception module 1931, a transmission module 1932, a processor 1933, a memory 1934 and a plurality of antennas 1935 for MIMO transmission and reception. The reception module 1931 may receive signals, data and information from the UE 1910 on uplink and receive inter-eNB information from the other eNB 1920. The transmission module 1932 may transmit signals, data and information to the UE 1910 on downlink and transmit inter-eNB information to the other eNB 1920. The processor 1933 may control overall operation of the eNB 1930.

The second eNB 1930 according to an embodiment of the present invention may be configured to support CoMP communication.

In addition, the processor 1933 of the second eNB 1930 may process information received by the second eNB 1930, information transmitted from the second eNB 1930 to the outside, etc. The memory 1934 may store processed information for a predetermined time and may be replaced by a component such as a buffer (not shown).

The aforementioned configurations of the eNBs and the UE 1910 may be implemented such that the above-described embodiments are independently applied or two or more thereof may be simultaneously applied and redundant description is omitted for clarity.

The description of the first eNB 1920 and/or the second eNB 1930 with reference to FIG. 19 may be equally applied to a relay corresponding to a downlink transmitting entity or an uplink reception entity.

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit data to and receive data from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes may be made to the present invention without departing from the spirit and essential characteristics of the present invention. For example, the structures of the above-described embodiments of the present invention may be used in combination. The above embodiments are therefore to be construed in all aspects as illustrative and not restrictive. Therefore, the present invention is not intended to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and novel features disclosed herein. It is obvious to those skilled in the art that claims that are not explicitly cited in each other in the appended claims may be presented in combination as an embodiment of the present invention or included as a new claim by subsequent amendment after the application is filed.

INDUSTRIAL APPLICABILITY

The above-described embodiments of the present invention are applicable to various mobile communication systems.

The invention claimed is:

1. A method for transmitting feedback information with respect to coordinated multi-point (CoMP) transmission in a wireless communication system, the method performed by a user equipment (UE) and comprising:
receiving muting point combination information about combinations of base stations not-participating in CoMP transmission from among a plurality of base stations;
receiving reference signals for feedback of channel state information (CSI) from the plurality of base stations capable of participating in CoMP transmission;
measuring channel state values with respect to the plurality of base stations on the basis of the reference signals; and
transmitting muting point information determined on the basis of the channel state values and indicating a preferred base station not-participating in CoMP transmission from among the plurality of base stations,
wherein the muting point information indicates one of the combinations included in the muting point combination information.

2. The method of claim 1, further comprising determining a base station not-participating in CoMP transmission from among the plurality of base stations on the basis of the muting point information on a network.

3. A method for transmitting feedback information with respect to CoMP transmission in a wireless communication system, the method performed by a user equipment (UE) and comprising:
receiving a first reference signal on the basis of first configuration information corresponding to a case in which interference from a plurality of base stations capable of participating in CoMP transmission is present;
receiving a second reference signal on the basis of second configuration information corresponding to a case in which interference from the remaining base stations, except for at least one of the plurality of base stations, is present;
respectively measuring a first channel state value and a second channel state value on the basis of the first reference signal and the second reference signal;
calculating a channel quality index (CQI) on the basis of one selected between the first channel state value and the second channel state value; and
transmitting the CQI and a selection index including information on the selection,
wherein the calculating of the CQI comprises:
calculating the CQI on the basis of the second channel state value when a difference between the second channel state value and the first channel state value is greater than a muting reference value, and
calculating the CQI on the basis of the first channel state value when the difference between the second channel state value and the first channel state value is less than or equal to the muting reference value.

4. The method of claim 3, wherein the first reference signal and the second reference signal are disposed in different subframes.

5. The method of claim 3, wherein the first reference signal and the second reference signal are disposed in different resource elements.

6. The method of claim 3, further comprising receiving the first configuration information and the second configuration information.

7. A user equipment (UE) for transmitting feedback information with respect to CoMP transmission in a wireless communication system, the UE comprising:
a receiver configured to receive downlink signals from a plurality of base stations capable of participating in CoMP transmission;
a transmitter configured to transmit an uplink signal to the plurality of base stations; and a processor configured to:
  control the receiver and the transmitter;
  receive muting point combination information about combinations of base stations not-participating in CoMP transmission from among the plurality of base stations;
  receive reference signals for CSI feedback from the plurality of base stations through the reception module;
  measure channel state values with respect to the plurality of base stations on the basis of the reference signals; and
  transmit muting point information through the transmission module, the muting point information being determined on the basis of the channel state values and indicating a preferred base station not-participating in CoMP transmission from among the plurality of base stations,
  wherein the muting point information indicates one of the combinations included in the muting point combination information.

8. A user equipment (UE) for transmitting feedback information with respect to CoMP transmission in a wireless communication system, the UE comprising:
  a receiver configured to receive downlink signals from a plurality of base stations capable of participating in CoMP transmission;
  a transmitter configured to transmit an uplink signal to the plurality of base stations; and
  a processor configured to:
    control the receiver and the transmitter;
    receive, through the reception module, a first reference signal on the basis of first configuration information corresponding to a case in which interference from a plurality of base stations capable of participating in CoMP transmission is present;
    receive, through the reception module, a second reference signal on the basis of second configuration information corresponding to a case in which interference from the remaining base stations, except for at least one of the plurality of base stations, is present;
    respectively measure a first channel state value and a second channel state value on the basis of the first reference signal and the second reference signal;
    calculate a CQI on the basis of one selected between the first channel state value and the second channel state value;
    transmit the CQI and a selection index including information on the selection through the transmission module;
    calculate the CQI on the basis of the second channel state value when a difference between the second channel state value and the first channel state value is greater than a muting reference value; and
    calculate the CQI on the basis of the first channel state value when the difference between the second channel state value and the first channel state value is less than or equal to the muting reference value.

* * * * *